United States Patent [19]

Schmidt

[11] Patent Number: 4,548,822

[45] Date of Patent: Oct. 22, 1985

[54] ACID SOLUBLE ANNATTO COLORANT IN A POWDERED FORM

[75] Inventor: Thomas R. Schmidt, Niles, Mich.

[73] Assignee: Miles Laboratories, Inc., Elkhart, Ind.

[21] Appl. No.: 606,155

[22] Filed: May 2, 1984

[51] Int. Cl.[4] .................... A23L 1/272; A23L 1/27
[52] U.S. Cl. .................... 426/96; 426/250; 426/540
[58] Field of Search ............ 426/250, 540, 96

[56] References Cited

U.S. PATENT DOCUMENTS

| | | | |
|---|---|---|---|
| 2,661,349 | 12/1953 | Caldwell et al. | 260/224 |
| 3,110,598 | 11/1963 | Müller et al. | 426/540 |
| 3,316,101 | 4/1967 | Borenstein et al. | 426/540 |
| 3,455,838 | 7/1969 | Marotta et al. | 252/316 |
| 3,790,688 | 2/1974 | Walter et al. | 426/540 |
| 3,931,433 | 1/1976 | Eskritt et al. | 426/540 |
| 4,133,900 | 1/1979 | Maing | 426/540 |
| 4,167,587 | 9/1979 | Danforth | 426/540 |
| 4,307,117 | 12/1981 | Leshik | 426/96 |

*Primary Examiner*—Jeanette Hunter
*Attorney, Agent, or Firm*—Jerome L. Jeffers

[57] ABSTRACT

Disclosed is a method for the preparation of an acid soluble annatto colorant in a powdered form and the annatto colorant prepared by this process. The method involves mixing an alkaline soluble annatto extract with an aqueous dispersion of a dextrinized starch derivative and drying the resultant to provide the desired product.

10 Claims, No Drawings

ACID SOLUBLE ANNATTO COLORANT IN A POWDERED FORM

BACKGROUND OF THE INVENTION

Annatto, i.e. the orange coloring matter from the pulp of the fruit seeds of the evergreen *Bixa orellana* is acceptable for use as a coloring in foods and is known to be useful in the coloration of cheese and milk. Annatto is soluble in water at a basic pH and can be obtained commercially in aqueous, basic solution. The material can be used as a coloring in the form of its solution or the pigment can be dispersed in various emulsifying agents and incorporated into the food to be colored in this form.

Annatto would be a desirable colorant for dry powdered beverages and dessert mixes, however, there is not presently available an annatto colorant in dry form which is resistant to precipitation at the low pHs commonly encountered when these materials are dissolved in water.

The use of pH sensitive dyes in dry food formulations is not new. For example, U.S. Pat. No. 4,307,117 discloses a dry food mix employing curcumin which has been dispersed in an aqueous film-forming solution containing an acid and drying the solution to render the alkaline sensitive colorant stable to food mixes even at basic pHs.

In U.S. Pat. No. 3,455,838, there is disclosed a method for encapsulating water insoluble substances which involves the spray-drying of an aqueous dispersion of a dextrinized starch acid-ester of a substituted dicarboxylic acid in which the water insoluble substance has been emulsified. The encapsulated particles are useful in the preparation of foods, pharmaceuticals and cosmetics. In using these acid-ester dextrins as encapsulating agents for the entrapment of oils and other water insoluble substances, it is first necessary to disperse or dissolve them in water to form a solution or dispersion by adding the dextrin to hot water with agitation whereupon the water insoluble substance to be entrapped is slowly added and the mixture rapidly agitated until emulsification is complete. The resulting emulsion is then dried by suitable means such as spray-drying.

SUMMARY OF THE INVENTION

The present invention is a method for the preparation of an annatto colorant in the dry form which is resistant to precipitation when placed in an acidic aqueous medium. The method comprises the steps of:

(a) providing an aqueous dispersion of a stabilizing agent which is a dextrinized waxy maize starch acid-ester of a substituted dicarboxylic acid characterized by the formula:

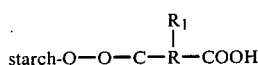

wherein R is $-(CH_2)_n-$ where n is 2 or 3 and $R_1$ is a hydrocarbon constituent selected from the group of alkyl, alkenyl, aralkyl and aralkenyl radicals containing from 5 to 18 carbon atoms;

(b) adding an alkaline, water soluble extract of annatto to the dispersion and blending the resultant to form a well-mixed and evenly colored mixture; and (c) drying the resulting mixture to form free-flowing particles comprising the starch as stabilizing agent co-dried with the annatto.

Also included within the scope of the present invention is the dry, acid resistant annatto colorant prepared by this process.

DESCRIPTION OF THE INVENTION

Often it is desirable to have a liquid substance in a dry free-flowing form. Certain liquid substances can be converted to the dry form by the application of heat to remove water or other volatile solvents. An example is the production of dried milk by the spray-drying of skim milk. Other liquid substances cannot be so treated without destroying one or more of their desirable properties and are many times blended with a dry carrier material to form a free-flowing mixture or are co-dried with a relatively inert carrier. Examples are spice oleoresins dry-blended with salt or dextrose and lactic acid spray-dried with a dextrin where the primary purpose is to prepare free-flowing particles.

While one of the purposes of encapsulation is the preparation of free-flowing particles, another very important purpose is to enclose or encapsulate an active agent with a film or coating consisting of a material in which the active agent is not soluble. The goals of encapsulation are to fully enclose the active agent so as to protect it from oxidation, volatilization and/or premature reaction with other product ingredients and for compatability with other product ingredients and for compatability with dry product mixes.

The advantage of the present invention lies in the fact that the procedure results in an acid resistant, free-flowing dry annatto which does not contain emulsifiers such as polyoxyethylene (20) sorbitan monooleate which current regulations do not permit for use in many of the products in which the acid resistant annatto powder can be used. These products include dry beverage mixes, dry gelatin desserts and other acid containing dry mixes. Due to the relatively low solubility of the annatto pigments in water insoluble materials, i.e. less than 0.3% (w/w) soluble in vegetable oil, it would not be possible to prepare a dried acid soluble annatto powder with a reasonable color intensity. To obtain a color intensity high enough to be practical, emulsifiers and/or solubilizers such as propylene glycol, polysorbate 81 and/or mono- and di-glycerides would need to be used. By using these, the material is no longer water soluble and the costs would be much higher.

Powders prepared by spray-drying using emulsified annatto pigments with the modified starch disclosed herein imparted considerable cloud when placed in solution, had a much lower color intensity and were much less stable in storage than those not so emulsified. They also exhibited less stability in solution after two days.

The first step in the process of the present invention involves the preparation of an aqueous dispersion of a dextrinized waxy maize starch acid-ester of a substituted dicarboxylic acid characterized by the formula:

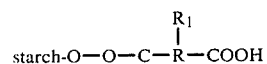

whereas R is $-(CH_2)_n-$ and n is 2 or 3 and $R_1$ is a hydrocarbon constituent selected from the group of alkyl, alkenyl, aralkyl and aralkenyl radicals containing from 5 to 18 carbon atoms.

These starch acid-esters are prepared by reacting an ungelatinized starch in an alkaline medium, with a substituted cyclic dicarboxylic acid anhydride of the formula:

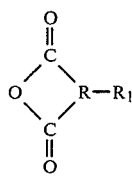

were R and $R_1$ are as defined above. Further details of the method for preparing the starch derivatives can be found in U.S. Pat. Nos. 3,455,838 and 2,661,349.

In forming the water dispersion of the starch derivative, it is added to the water, which has been preheated to a temperature of from about 100° to 210° F., with agitation at a level of from about 20% to 65% (w/w). The pH of the dispersion is normally in the range of from about 2.5 to 3.5 before addition of the annatto. However, this is not too important when using alkaline annatto extracts because the pH raises rapidly upon addition of the extract which has a pH of 12.5 to 13.5.

After formation of the starch dispersion, an alkaline, water soluble annatto preparation is added with thorough blending to form a well-mixed and evenly colored mixture. The annatto extract is prepared by direct extraction of annatto seeds into an alkaline aqueous solution followed by a mild heating step and filtration. It can also prepared by extracting the seeds or seed coat with a suitable solvent (acetone, ethylene dichloride, hexane, isopropyl alcohol, methyl alcohol or methylene chloride), stripping the solvent and dissolving the annatto concentrate in an alkaline aqueous solution with the application of heat. The material used in the examples which follow was prepared by direct extraction into an alkaline solution containing 4% (w/w) potassium hydroxide. Sufficient seed was used so as to obtain an absorbance value of 0.445 to 0.460 for a 0.005% (v/v) solution when read at 453 nm in a 1.0 cm cell on a suitable spectrophotometer. The extract is added to the dispersion in an amount of up to 65% (w/w) and preferably from 5 to 35% (w/w) based on the dry weight of the annatto to the dry weight of the starch.

After addition of the annatto extract to the starch dispersion, the dispersion is sufficiently agitated to provide an evenly mixed and colored product. This product may then be dried by any suitable means to provide the desired free-flowing, dry acid insensitive annatto preparation.

Spray-drying is the preferred means of drying the preparation and is typically accomplished by using commercially available spray-drying equipment capable of drying a wet mix slurry containing from 25% to 50% (w/w) solids to a final powder moisture of 3.0% to 6.0% while maintaining a dryer outlet temperature below 170° F. Dryer spray nozzles and drying conditions must be selected to give a particle size of less than 150 microns without case hardening or scorching of particles.

The method of practicing the present invention is further illustrated by the following examples:

EXAMPLE I

In a laboratory-sized Waring blender, 100 g of heated water (60° C.) was blended with 100 g of Capsul ®, a dextrinized waxy maize starch acid-ester of a substituted succinic acid derived from octenyl succinic acid anhydride characterized by the formula:

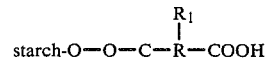

where R is $-(CH_2)_2$ and $R_1$ is $HC=CH(CH_2)_6$ sold by The National Starch and Chemical Co. One hundred grams of an aqueous solution of an alkaline, water soluble annatto extract prepared by direct extraction of annatto seeds in an alkaline aqueous solution [4% (w/w) potassium hydroxide] with mild heat followed by filtration. The extract had a color equivalent of 3.15%±0.07% as norbixin. This extract, which contained approximately 16% annatto solids was blended into the Capsul ® water dispersion. The resultant mixture was then dried in a laboratory vacuum oven for 18 hours at 40° C. under a 24 inch vacuum whereupon the dried material was pulverized with a mortar and pestle to a particle size of less than 150 microns. The resultant powder was a bright orange color with a characteristic carotenoid odor. The powdered material's solubility characteristics were such that the powder was found to be soluble in distilled water, tap water, water with a high calcium ion content, acidified water (pH 2.1), partially dispersible in a vegetable oil and water emulsion. The powder also had an emulsion stabilizing effect on the oil and water emulsion.

EXAMPLE II

In a laboratory-size Waring blender, 1000 g of heated water (60° C.) was blended with 850 g of Capsul ®. To this dispersion was added 150 g of an aqueous solution (16% solids) of an alkaline water soluble annatto extract. This mixture was well-blended and then dried by spray-drying in a pilot plant Niro dryer. The mixture was dried using an outlet temperature of 158° F. The above described procedure was then repeated under identical conditions except that an outlet temperature of 175° F. was substituted for the outlet temperature of 158° F. in one run and an outlet temperature of 195° F. was substituted for the outlet temperature of 158° F. in another run. The resultant orange powders all had a particle size of less than 150 microns. All of the powders were soluble in water over a pH range of 1.5 to 14.0 and in water containing calcium ions. They were dispersible in vegetable oil and water emulsions and partially soluble in vegetable oil.

The color loss during storage was greatest for the powder dried with an outlet temperature of 195° F. and was least for the powder dried with an outlet temperature of 158° F.

EXAMPLE III

A spray-dried Capsul ®/Annatto preparation was prepared as in Example II except that the dispersion comprised 1200 g of Capsul ® and 800 g of the annatto solution which had been added to 1000 g of water at 60° C. The mixture was dried with a dryer outlet temperature of 158° F. The resultant powder thus produced was comparable to that in Example II.

The above described procedure was repeated under identical conditions with the following exceptions and variations from run to run.

(1) the dispersion contained 675 g Capsul®, 1325 g of the annatto solution and 885 g water;
(2) the dispersion contained 500 g Capsul®, 1500 g of the annatto solution and 740 g of water;
(3) the dispersion contained 400 g Capsul®, 1600 g of the annatto solution and 650 g of water.

The dried powders prepared from dispersions 1 and 2 had characteristics comparable to those obtained using the procedure in Example II. The powder produced using a dispersion consisting of 400 g Capsul® with 1600 g annatto solution precipitated out of a solution with a pH of 3.0.

This example illustrates that the ratio of annatto extract to starch is limited and that the maximum percentage of annatto extract (dry solids) to starch is about 65% (w/w).

EXAMPLE IV

In a laboratory-size Waring blender, 1000 g of heated water (60° C.) was blended with 740 g of gum arabic. To this dispersion was added 150 g of an aqueous solution (16% solids) of an alkaline water soluble annatto extract prepared as in Example I. The mixture was well-blended and then spray-dried in a pilot plant Niro dryer with an outlet temperature of 158° F. The dried powder was reddish-orange and was not soluble in water with a pH of 3.0.

The above described procedure was repeated except that a malto-dextrin (Grain Processing Corporation's Maltrin®-M100) was substituted for gum arabic. The resultant orange powder was not soluble in water with a pH of 3.0.

This example illustrates that other carriers widely used for co-drying or encapsulating (when the active agent is water insoluble) do not impart acid resistance to the annatto extract.

EXAMPLE V

In a laboratory-size Waring blender, 300 g of heated water (60° C.) was blended with 450 g of Capsul®. To this dispersion was added 250 g of an aqueous solution (16% solids) of an alkaline water soluble annatto extract. This mixture was well-blended and then dried in a laboratory-scale freeze-drier. The freeze-dried material was milled on a laboratory-scale hammer mill. The resultant dried product was found to be soluble in water over a pH range of 1.5 to 14.0. Color loss due to drying was slightly less than the color loss during spray-drying. Shelf stability was not improved. This example demonstrates that drying means other than spray-drying can be used to produce the acid soluble powder.

EXAMPLE VI

In a Cowles dissolver, 2530 lbs. of heated water (140° F.) was blended with 1100 lbs. of Capsul®. To this was added 2405 lbs. of an aqueous solution (16% solids) of an alkaline water soluble annatto extract prepared as in Example I. To this homogenous dispersion was added an additional 1100 lbs. of Capsul®. The mixture was blended thoroughly and pumped to a holding tank. From the holding tank, the mixture was passed through a high pressure pump to a spray-dryer. Spray nozzles and drying conditions were such that a fine powder was produced with a moisture content of from 2.5% to 3.5%. The orange powder had a particle size of less than 150 microns and had solubility characteristics comparable to the powders produced in Example II.

What is claimed is:

1. A method for the preparation of an annatto colorant in the dry form which is resistant to precipitation when placed in an acidic aqueous medium which method comprises the steps of:
   (a) providing an aqueous dispersion of a stabilizing agent which is a dextrinized waxy maize starch acid-ester of a substituted dicarboxylic acid characterized by the formula:

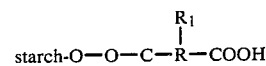

wherein R is $-(CH_2)_n-$ where n is 2 or 3 and $R_1$ is a hydrocarbon constituent selected from the group of alkyl, alkenyl, aralkyl and aralkenyl radicals containing from 5 to 18 carbon atoms;
   (b) adding an alkaline, water soluble extract of annatto to the dispersion and blending the resultant to form a well-mixed and evenly colored mixture; and
   (c) drying the resulting mixture to form free-flowing particles comprising the starch as stabilizing agent co-dried with the annatto.

2. The method of claim 1 wherein the amount of the dry weight of the annatto is up to 65% (w/w) of the dry weight of the starch.

3. The method of claim 1 wherein the aqueous dispersion of the stabilizing agent is formed by adding the stabilizing agent to water which has been preheated to a temperature of from about 100° to 210° F. in an amount of from about 20% to 65% (w/w) of the water.

4. The method of claim 1 wherein the annatto extract is prepared by the direct extraction of annatto seeds into an alkaline aqueous solution followed by a mild heating step and filtration.

5. The method of claim 1 wherein the stabilizing agent/annatto mixture is spray-dried.

6. The method of claim 1 wherein the annatto extract is added to the stabilizing agent dispersion in an amount sufficient to provide up to 65% (w/w) annatto based on the dry weight of the annatto to the dry weight of the stabilizing agent.

7. The method of claim 6 wherein the extract is added in an amount sufficient to provide 5 to 35%.

8. The method of claim 1 wherein R is $-(CH_2)_2-$ and $R_1$ is $(CH_2)_6CH=CH$.

9. A method for the preparation of an annatto colorant in the dry form which is resistant to precipitation when placed in an acidic aqueous medium which method comprises the steps of:
   (a) providing an aqueous dispersion containing from 20% to 65% (w/w) of a stabilizing agent which is a dextrinized waxy maize starch acid-ester of a substituted dicarboxylic acid characterized by the formula:

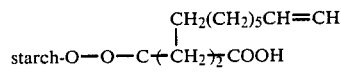

(b) adding an alkaline, water soluble extract of annatto to the dispersion in an amount sufficient to provide 5 to 35% (w/w) annatto based on the dry weight of the annatto to the dry weight of the stabilizing agent to the dispersion and blending the resultant to form a well-mixed and evenly colored mixture; and (c) spray-drying the resulting mixture to form free-flowing particles comprising the starch as stabilizing agent co-dried with the annatto.

10. An annatto colorant in dry form which is resistant to precipitation when placed in an acidic aqueous medium prepared by the method of claim 9.

* * * * *